United States Patent [19]

Wong

[11] Patent Number: 5,131,766
[45] Date of Patent: Jul. 21, 1992

[54] METHOD FOR ENCODING CHINESE ALPHABETIC CHARACTERS

[76] Inventor: Kam-Fu Wong, 22nd Floor, Wu Sang House, 655 Nathan Road, Kowloon, Hong Kong

[21] Appl. No.: 599,725

[22] Filed: Oct. 19, 1990

Related U.S. Application Data

[62] Division of Ser. No. 253,910, Oct. 6, 1988, abandoned, which is a division of Ser. No. 313,543, Dec. 26, 1985, abandoned.

[51] Int. Cl.⁵ .................................................. B41J 5/00
[52] U.S. Cl. ....................................... 400/110; 364/419
[58] Field of Search .................. 400/109, 110; 364/419

[56] References Cited

U.S. PATENT DOCUMENTS

4,679,951  7/1980  King ................................. 400/110

FOREIGN PATENT DOCUMENTS

2116341  2/1983  United Kingdom ............... 400/110

Primary Examiner—David A. Wiecking
Assistant Examiner—Steven S. Kelley
Attorney, Agent, or Firm—Banner, Birch, McKie & Beckett

[57] ABSTRACT

An apparatus and method for encoding chinese characters into a computer. Each character is divided into a leading part and a body part. The leading part is represented by one code element and the body part is represented by four code elements. The code elements are input to the computer using a keyboard, with the code element for the leading part being input first followed by the code elements for the body part.

13 Claims, 5 Drawing Sheets

FIG. 1

| STROKE | 人 八 | ㄥ ㇏ | l ↓ | ㄇ ㄇ | ′ ╱ | ˋ ╲ | ─ ╱ | ㄱ ㄱ | ╋ ╪ | ㄩ ˇ |
|---|---|---|---|---|---|---|---|---|---|---|
| CORRESPONDING DIGIT | 1 | 2 | 3 | 4 | 5 | 6 | 7 | 8 | 9 | 0 |
| KEY IN THE KEYBOARD | A | S | D | F | G | H | J | K | L | ; |

| LEADING PART, PAGE | LEADING PART, PAGE | LEADING PART, PAGE | LEADING PART, PAGE | LEADING PART, PAGE |
|---|---|---|---|---|
| 人八 1- | 彳山 11- | 扌 21- | 鱼角 31- | 矢田舌 41- |
| 乙丶 2- | 广日 12- | 石尸 22- | 革身 32- | 西学糸 42- |
| 丨丿 3- | 亻走 13- | 王门 23- | 酉卩 33- | 敝羽非 43- |
| 口冂 4- | 扌贝 14- | 纟目 24- | 彐豕歹 34- | 戊才至 44- |
| 丿 5- | 氵阝 15- | 禾足 25- | 夕夂 35- | 幸虫亦 45- |
| 丶丶 6- | 艹牛 16- | 辶雨 26- | 虍气户 36- | |
| 一 · 7- | 氵冫 17- | 钅弓 27- | 关夫芦 37- | |
| 乛丁 8- | 木立 18- | 月米 28- | 方白巾 38- | |
| 十忄 9- | 宀土 19- | 亻马 29- | 主止工 39- | |
| 亠丷 0- | 灬火 20- | 女车 30- | 耳舟其 40- | |

| 柬2759 | 安275 | 宝7967 | 宣5373 | 察5866 | 宅527 | 穿1732 | 窗1545 | 定7357 | 富1007 | 输入键 |
| 埃2657 | 坝275 | | 埠5837 | 场8855 | 坡2675 | 赤531 | | 吴4773 | 嵩9574 | 堆5309 | ✱— |

FIG. 5(B)

| 宾373 | 察866 | 宠672 | 左 672 | 客864 | 董562 | 宿375 | 克868 | 元72 | 输入码 |
| 埠837 | 赤31 | | 堆309 | 均729 | 坛574 | 郝318 | 涞319 | 均867 | 志266 | ✱-5 |

FIG. 5(C)

| 察66 | 客64 | 宛68 | | 输入码 |
| 埠37 | 均67 | 圹1 | 均7 | ✱-58 |

FIG. 5(D)

| 察6 | 客4 | 宛8 | 输入码 |
| 均7 | | | ✱-586 |

FIG. 5(E)

| 客 | ★ -5864 | 输入码 |
|---|---|---|

FIG. 5(F)

| 发 o | 伐 o | 罚 o | 云 o | 法 o | 反 an | 返 an | 范 an | 翻 an | 拼音输入码 |
|---|---|---|---|---|---|---|---|---|---|
| 非 EI | 妃 ei | 翡 ei | 费 ei | 丰 eng | 封 eng | 峰 eng | 风 eng | 冯 eng | f- |

FIG. 5(G)

| 非 i | 菲 i | 飞 i | 妃 i | 匪 i | 诽 i | 吠 i | 肺 i | 废 i | 拼音输入码 |
|---|---|---|---|---|---|---|---|---|---|
| 费 n | 芬 n | 酚 n | 分 n | 氛 n | 纷 n | 扮 n | 焚 n | 汾 n | f-e |

FIG. 5(H)

| . | , | ˇ | ˇ | ˇ | ˇ | ` | ` | ` | 声调 |
|---|---|---|---|---|---|---|---|---|---|
| 非 | 啡 | 飞 | 肥 | 匪 | 诽 | 肺 | 废 | | 拼音输入码 f-ei 请选择 |

METHOD FOR ENCODING CHINESE ALPHABETIC CHARACTERS

This application is a divisional application of Ser. No. 253,910 filed on Oct. 6, 1988, now abandoned which is a divisional application of Ser. No. 813,543 filed on Dec. 26, 1985, now abandoned.

BACKGROUND OF THE INVENTION

The invention relates to a system for encoding Chinese characters by means of which Chinese characters can be fed into an electronic computer, telex or teleprinter machine or the like, and the system can also be used to index a Chinese directory.

Up to now, there are more than 400 methods for encoding Chinese characters including the method of encoding Chinese characters in numerical notation described and claimed in United Kingdom Patent No. 2,100,899, but only a few are workable. Generally speaking, there are five categories of systems for encoding and inputting Chinese characters.

1. Phonetically Alphabetic System

This kind of system is only applicable to professional computer operators who have a good command of Chinese alphabetic spelling. Only when the alphabetic spelling is 100 percent correct, can the character be identified. Since there are many homonyms in Chinese characters, it is too hard or even impossible for a person who does not know Chinese alphabetic spelling or only has scant knowledge thereof.

2. Large Keyboard System

Under this system, the whole character is fed into a computer by only one key. Only those characters which are on the keyboard can be fed into the computer. It needs a very large keyboard which occupies a large space. Furthermore, it take a long time to get familiar with the keyboard. It is very difficult for an operator to type or feed into a computer without looking at the keyboard.

3. Parts System

Under this system, the Chinese character is divided into several parts. One part is given a code (or digit) that can be fed into a computer. The advantage of this system is that the Chinese character can be easily divided and quickly fed into a computer, for example, 日+月=明, 彳+王=往. Such feeding depends on 100 per cent correct division of the character, otherwise the character can not be identified. Some characters, for example "擒,冀,高,", are almost impossible to divide into parts, particularly for those who are not familiar with Chinese characters. Another drawback is that there is no strict rule for such division and the division of a character varies from person to person, therefore it is not easy to correctly divide a character.

4. Number Code System

This is a better system which is relatively easy to learn. But it usually involves a long code and some characters may have the same codes as others. The procedure of encoding under this system is first to divide a character into several parts and then give each part a digit. Since there is no strict rule in dividing a character into parts and a stroke may be given a different digit in different characters, this system also has obvious drawbacks.

5. Word, Phrase and Sentence System

This encoding system has numerous Chinese characters. Under this system Chinese characters forming 20,000 phrases and sentences are encoded and the whole phrase or whole sentence is fed into a computer. This system is only suitable to a computer which has good performance and large storage space.

In summary, it can be seen that each the five systems has its own serious drawbacks. It is too difficult to divide Chinese characters into parts and then encode them. In addition, it is very inconvenient to encode a Chinese character stroke by stroke and the code is quite long. The Chinese character consists of a leading part and a body part or strokes. Dividing them is very difficult.

SUMMARY OF THE INVENTION

It is therefore an object of the present invention to provide a simple encoding system for Chinese characters and in particular, a system whereby the character can be encoded in a form suitable for simple and quick entry into an electronic computer.

According to the present invention, each Chinese character is considered as a plain figure which can be divided into two parts, a leading part and a body part. The leading part is represented by one code element and the body part is represented by four code elements (digits). The code element for the leading part is first fed into a computer, and then the code elements for the body part are fed into a computer, so that the whole Chinese character can be fed into the computer.

Since the encoding system of the present invention is not based on Phonetical Alphabet or stroke order of hand writing, it is especially suitable for those who are not familiar with Chinese characters. By means of the encoding method of the present invention anyone can feed Chinese characters into computers without difficulties whether he or she knows phonetical Alphabet and the Chinese hand writing rules for Chinese characters or not.

The keyboard of the present invention can be used for Chinese characters and letters of the Roman Alphabet. It can be used anywhere in the world. Additionally, one can use it to touch type, that is typewriting without looking at the keyboard.

BRIEF DESCRIPTION OF THE DRAWINGS

FIG. 1 shows a keyboard arrangement of the encoding system of the present invention.

FIG. 3 shows an index example of the Chinese dictionary compiled according to the encoding system of this invention.

FIGS. 5A-5H illustrate the encoding of a Chinese character.

FIG. 6 illustrates a Chinese dictionary index in accordance with the present invention.

DETAILED DESCRIPTION OF THE INVENTION

Figure 1:
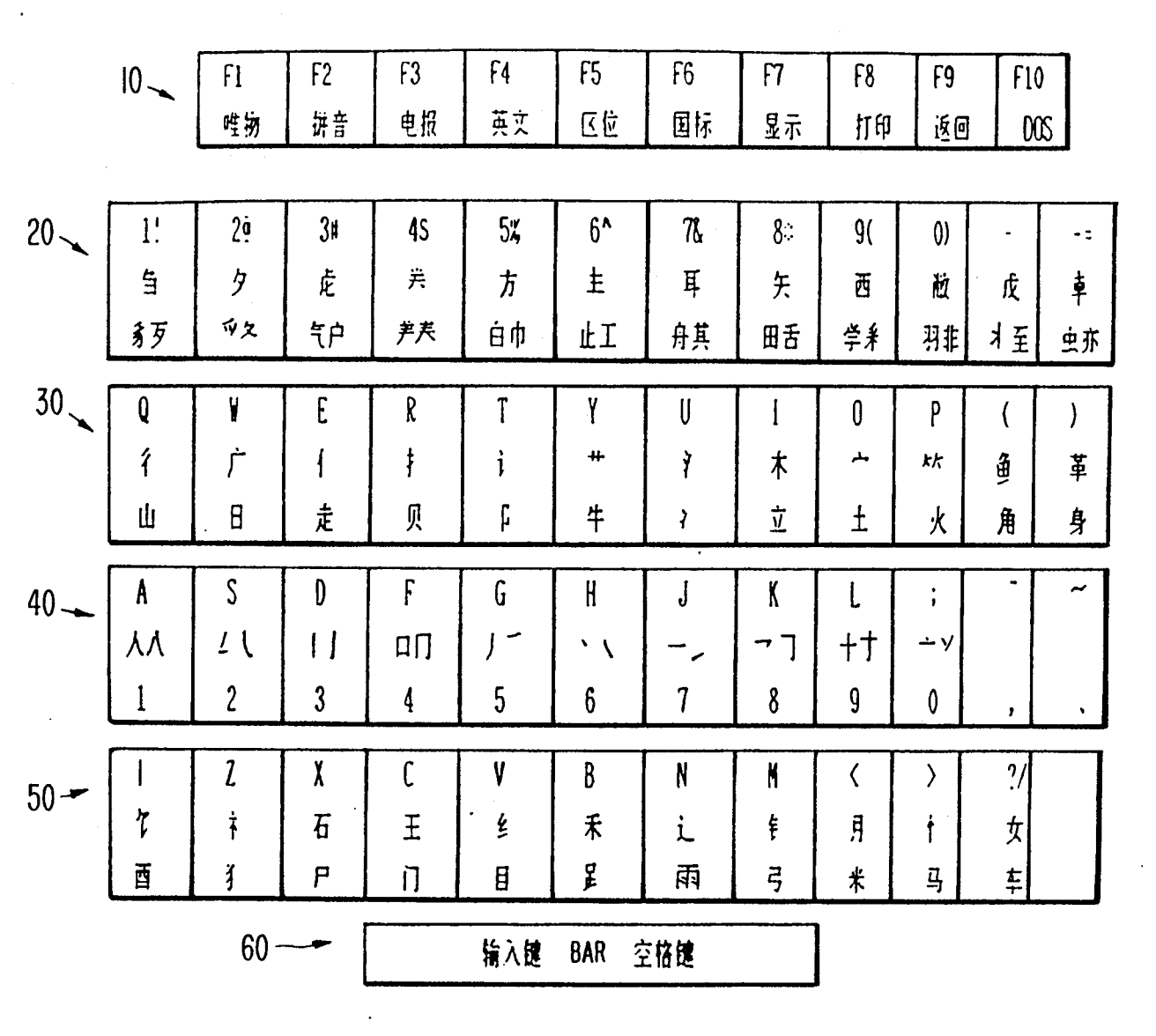
Figures 2, 4:
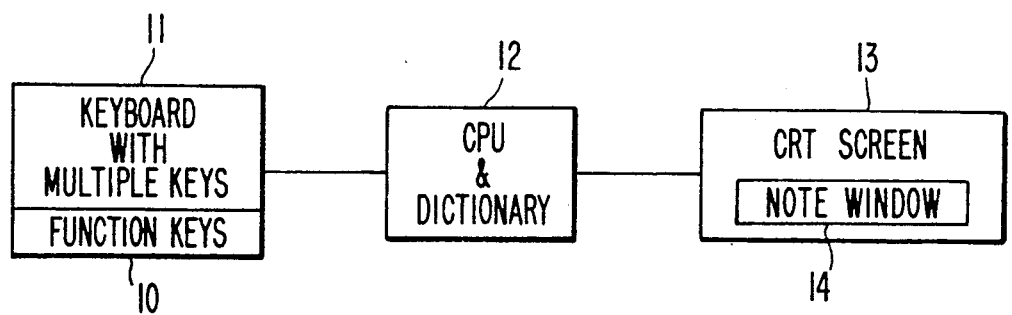
FIG. 2 shows the relation between ten basic strokes and the corresponding keys on the keyboard of the encoding system of this invention.
FIG. 4 is block diagram illustrating a computer system in accordance with applicant's invention.

According to the present invention, and with reference to FIG. 1 of the drawings, there are eighty-two leading parts which are arranged on thirty-five keys three leading parts on each of the twelve keys in the second row 20 from the top of FIG. 1, two leading parts on each of the twelve keys in the third row 30 from the top of FIG. 1 and two leading parts on each of the first eleven keys in the fifth row 50 from the top of FIG. 1. With the help of leading-part-keys the operator can easily divide a Chinese character into a leading part and a body part and does not need to think how to divide them so as to decrease hesitation during the division of the leading part and the body part, decrease memory, decrease consideration pressure and increase encoding velocity.

For the body part there are ten stroke shapes  which are represented respectively by 1, 2, 3, 4, 5, 6, 7, 8, 9, 0 in FIG. 1 and FIG. 2 (i.e. key A, S, D F, G, H, J, K, L;). Since for most Chinese characters it is necessary to push three or four body-part-keys, it is convenient to arrange the body-part-keys in the positions which are frequently used so that the moving frequency of the fingers can be decreased and encoding velocity can be increased.

During encoding, one divides a Chinese character into a leading part and a body part as shown in FIG. 3, finds the corresponding lead-part-key on the keyboard and presses it. The code representing the lead part is then fed into a computer as shown in FIG. 2. For example, if someone wants to feed the Chinese character "躯" into a computer, he will divide "躯" into "身" and "区". The "身" is the leading part. On the keyboard he can find the leading-part-key for the leading part "身" and then press it. The leading part "身" is now fed into the computer. The lower part and the right part of a character, however, can not be called the leading part. Therefore, these parts cannot be fed in by leading-part-keys. By way of example, the character "邯" has a part "卩" on the right. Although the "卩" part has a key on the keyboard representing the same as a leading part, the "卩" part of the character can not be input by that key. The character "邯" thus can only be treated as a connected character. Another example is "塑". The "塑" part can not be input by the same leading part key. This character "塑" can only be inputted as a connected character.

After the leading part is fed into the computer, the body part of the character can be encoded. The number of strokes extracted from the body part for encoding is, at most, four. The basic rule for taking strokes upper level first, lower second. For example, the character "证", has a leading part "讠" and the first four strokes of the body part are "—", "|", "|" and "—" corresponding to code element (digits) 7, 3, 3 and 7, so the code of the character "证" is 讠7337. For another example, the Chinese character "订" can be divided into the leading part "讠" and the body part "丁". The strokes of this body part are "—" and "亅" corresponding digits 7 and 3, so the code for "订" is 讠73.

But there are some Chinese characters whose body part can be divided into a left part and a right part. For those characters there is another rule for taking strokes, left first, right second. By way of example, the body part "对" of the character "树" can be divided into "又" and "寸". In encoding it one first takes the strokes of the left part "又" and then the strokes of the right part "寸" following the rule upper first, lower second.

For characters which can be divided into an outside part and an inside part the rule for taking strokes is outside first, inside second. Of course for the inside sub-part or outside sub-part it is still the rule upper first, lower second. For example, the character "涵" which has the body part "圅", its outside part is "凵", inside part is "丞", the first four strokes of the body part are "L", "|", "一" and "亅".

The connected characters are those characters which have no leading parts. So the code for such characters should be taken stroke by stroke. The number of strokes taken from connected characters is, at most, five. The rule for coding connected characters is the same as the rule for the body part of characters. For example, the code for character "又" is 656, the code for the character "甘" is 07547.

The keyboard of the present invention can be the normal Roman letter keyboard, see FIG. 1. The first row of keys from the top serve as function keys by means of which the feeding mode can be selected. For example, $F_1$ represents the feeding mode of the encoding system according to the present invention. $F_2$ represents the feeding mode of the Phonetically Alphabetic system. Examples of assignments for the other function keys are set forth below.

$F_3$—telegram
$F_4$—type in English
$F_5$—regional code
$F_6$—international code
$F_7$—display
$F_8$—print
$F_9$—return
$F_{10}$—interchange PC system (English) with SP system (Chinese With respect to function keys $F_5$ and $F_6$, in the fundamental library of Chinese characters, each character carries two fixed codes, a regional and international code. Thus, function keys $F_5$ and $F_6$ set these codes accordingly.

The second, third and fifth rows 20, 30 and 50 from the top of FIG. 1 the keyboard serve as "leading-part-keys". Eighty-two (82) basic leading parts are arranged on 35 keys. Though each leading-part-key shows three leading parts, the correct one is automatically selected by the computer when the body part of the character is entered.

In the fourth row 40, the first ten keys from the left serve as "body-part-keys" each of which corresponds to two similar strokes, see FIG. 2. The computer 12 also selects the correct body-part from among the two on each body-part-key.

The lowest bar-key on the keyboard serves the feeding key which is used after encoding. Of course the bar key 60 is also the space key.

Furthermore the last two lines on the bottom of the screen 13 of the computer 12 act as a "note-window" 14 which displays twenty-two Chinese characters and their codes in two lines. The computer operator can see the Chinese characters and their codes on the screen 13 so that he can learn the code by looking at the "note-window" 14 and he need not look for the code of some hard-to-encode character in the code hand-book.

By way of example, it is desired to feed the character "客" into a computer whose leading part is "宀".

First: when the leading part-key "宀土" is pressed, 22 Chinese characters which have leading part "宀 or 土"

are shown on the "note-window", most of them having a code composed of 4 digits.

An example of the Chinese characters and associated codes is shown in FIG. 5(A).

Since the body part of "冬" is "various" the first stroke of which is "/" corresponding to the digit 5, the second step is pressing the body-part-key "5". A few of the characters, whose body parts have as a first stroke "/" which also have the leading part "宀" or "土", are shown in the "note-window 14". These characters have left, at most, 3 digits as shown in FIG. 5(B).

Since the second stroke of body part "冬" is "7" corresponding to digit 8, the third step is to press the body part-key "8". A number of characters which have second stroke "7" in its body part are shown in the "note-window" 14. These characters have left at most, as shown in FIGS. 5(C).

Since the third stroke of the body part "冬" is "\" corresponding to digit 6, the fourth step is to press the body-part-key "6". A number of characters which have third stroke "\" in its body part are shown in the "note-window" 14 as shown in FIG. 5(D).

The fourth stoke of the body part "口" corresponds to digit 4.

Fifth step: press the body part key "4". The character "冬" is the one that remains in the "note-window" 14; by pressing the bar key 60, one can feed the character "冬" into a computer 12.

In the same way, the Chinese character can be fed into computer 12 by means of a phonetically alphabetic system.

For example, feeding the character "肥" which has phonetical alphabetic "Fei".

First step: pressing the key F, then a number of characters which have the phonetical Alphabet F will be shown in the "note-window". The area on the far right shows the Alphabet fed into a computer 12.

Second step: pressing the key "e". The "note-window" 14 then will show many characters as shown in FIG. 5(G).

Third step: pressing the key "i". All characters which have the same Ponetical Alphabet "Fei"; and their symbols are shown in the "note-window" 14. You can now select "肥" from them as shown in FIG. 5(H)

Another advantage of the present invention is that there are two or more codes for one character. This advantage is very convenient for the operator. If one character has only one code, it will be necessary to have 100% correct encoding and feeding, otherwise. One cannot find the character. If there are two or more codes for one character it will make the encoding much easier. For example, the character "薯" has two codes, Y0591 and YWI through which the character "薯" can fed into the computer 12, so that the feeding velocity and efficiency will be improved.

This system for encoding Chinese characters can also be used for indexing a Chinese dictionary. This is a new development in indexing a Chinese character. Under this system, characters of the same code are put on the same page of the dictionary. Under this system the leading part code and body part code are used as the page number in a Chinese dictionary, which makes searching for a words in such a dictionary simpler.

For example, it is desired to search the character "渔". The procedures for searching the character "渔" are:

(1) to determine the leading part code first. From FIG. 3 you can find to code for "氵" is 17 which corresponds to page 17 in the dictionary.

(2) to determine the body part code. In this case the body part is "鱼". The first stroke of "鱼" is "/" corresponding to digit 5.

(3) So the character "渔" can be found on page "17-5". See FIG. 6.

FIG. 4 illustrates a block diagram of a keyboard and system for encoding Chinese characters of the present invention. CPU and dictionary 12 is coupled to keyboard 11 and CRT Screen 13. Keyboard 11 includes multiple keys for inputting leading and body parts of Chinese characters into CPU 12. Keyboard 11 also includes function keys 10 for selecting between different modes of the system, such as feeding mode, regional code, international code, type in English, etc. CPU and dictionary 12 operate to generate a particular Chinese character in response to the characters leading part, strokes and corresponding body parts. The body parts are entered using keyboard 11 and may comprise up to 4 number codes. CRT Screen 13 visually displays the character or other information to the user. Note window 14 may comprise the lower two lines of CRT Screen 13 and displays a series of possible characters and their corresponding number codes for a selected leading part.

I claim:

1. A method of encoding Chinese characters and inputting said characters into a machine wherein each character has a first part which comprises a leading part corresponding to one of a predetermined group of leading parts and a second part comprising a body part with at least one stroke, said first part is input as a whole and one or more strokes of said second part of said character are input separately in a predetermined order and when said first part does not correspond to any of said predetermined group of leading parts, the strokes of said first part and second part of said character are input as separate strokes.

2. A method as claimed in claim 1 wherein said predetermined group of leading parts comprises a plurality of leading parts and each leading part is inputted by using only one key of said machine.

3. A method as claimed in claim 1 wherein said leading part is input before said body part.

4. A method as claimed in claim 1 wherein said second part comprises at most four strokes, each of which is one of ten basic strokes provided for encoding and inputting said second part.

5. A method as claimed in claim 1 wherein said first part is encoded before said second part is encoded.

6. A method as claimed in claim 1 wherein said predetermined order for inputting the strokes of said second part comprises inputting the uppermost stroke first and successively inputting the next uppermost stroke until the lowermost stroke is input.

7. A method as claimed in claim 6 wherein said predetermined order for inputting the strokes of said second part, when said second part may be divided into subparts comprising a left part and a right part, comprising inputting said left part first and said right part second.

8. A method as claimed in claim 6 wherein said predetermined order for inputting the strokes of said second part, when said second part may be divided into subparts comprising an outside part and an inside part, comprises inputting said outside part first and second inside part second.

9. A method as claimed in claim 7 wherein said predetermined order for inputting the strokes of a subpart of said second part comprises inputting the uppermost stroke first and successively inputting the next uppermost stroke until the lowermost stroke is input.

10. A method as claimed in claim 1 wherein said machine comprises a viewing screen with a note window comprising at least two lines near the bottom of said screen.

11. A method as claimed in claim 1 wherein said predetermined group of leading parts holds eighty-two leading parts, which are basic leading parts extracted from all Chinese characters.

12. A method as claimed in claim 11 wherein said predetermined group of leading parts does not hold the leading part of a character, and the character is input by encoding up to five strokes of the character using the same rule as for encoding the body part of a character whose leading part is held in said predetermined group of leading parts.

13. A method as claimed in claim 1 wherein a character can be encoded in at least two different ways.

* * * * *